US010351057B2

(12) United States Patent
Ohashi

(10) Patent No.: US 10,351,057 B2

(45) Date of Patent: Jul. 16, 2019

(54) IN-VEHICLE PRODUCTION LIGHTING SYSTEM

(71) Applicant: Yazaki Corporation, Tokyo (JP)

(72) Inventor: Tomonori Ohashi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/725,377

(22) Filed: Oct. 5, 2017

(65) Prior Publication Data

US 2018/0105102 A1 Apr. 19, 2018

(30) Foreign Application Priority Data

Oct. 13, 2016 (JP) ................................ 2016-201419

(51) Int. Cl.

| | |
|---|---|
| ***B60Q 3/10*** | (2017.01) |
| ***B60Q 3/20*** | (2017.01) |
| ***B60Q 3/74*** | (2017.01) |
| ***B60Q 3/80*** | (2017.01) |
| ***B60Q 3/217*** | (2017.01) |
| ***B60Q 3/283*** | (2017.01) |
| ***H05B 33/08*** | (2006.01) |
| ***H05B 37/02*** | (2006.01) |

(52) U.S. Cl.

CPC ............... *B60Q 3/745* (2017.02); *B60Q 3/10* (2017.02); *B60Q 3/217* (2017.02); *B60Q 3/283* (2017.02); *B60Q 3/80* (2017.02); *H05B 33/0854* (2013.01); *H05B 33/0872* (2013.01); *H05B 37/0227* (2013.01)

(58) Field of Classification Search

CPC ............ H05B 33/0845; H05B 33/0854; H05B 33/0857; H05B 33/0872; H05B 33/08; B60Q 3/74; B60Q 3/745; B60Q 3/80; B60Q 3/217; B60Q 3/10; B60Q 3/283; B60Q 3/20

See application file for complete search history.

(56) References Cited

U.S. PATENT DOCUMENTS 6,305,760 B1 * 10/2001 Otake .................. B60T 8/1755 303/112

8,294,564 B1 * 10/2012 Smith ...................... G08B 5/36 340/425.5

(Continued)

FOREIGN PATENT DOCUMENTS

JP 2003-276503 A 10/2003

JP 2005-265800 A 9/2005

(Continued)

OTHER PUBLICATIONS

Communication dated Oct. 2, 2018 issued by the Japanese Patent Office in counterpart application No. 2016-201419.

*Primary Examiner* — Thai Pham

(74) *Attorney, Agent, or Firm* — Sughrue Mion, PLLC

(57) ABSTRACT

An in-vehicle production lighting system includes: an acceleration sensor configured to detect an acceleration of a vehicle; light emitters arranged at a prescribed position in a cabin of the vehicle and capable of changing light intensity and light color in a prescribed lighting pattern; and a controller configured to generate or select the prescribed lighting pattern depending on a detection result obtained by the acceleration sensor and control the light emitters.

7 Claims, 8 Drawing Sheets

(56) References Cited

U.S. PATENT DOCUMENTS

| | | | | |
|---|---|---|---|---|
| 8,405,498 | B1 * | 3/2013 | Smith | B60R 21/01 340/463 |
| 2003/0130778 | A1 * | 7/2003 | Hrovat | B60R 16/0233 701/45 |
| 2004/0088097 | A1 * | 5/2004 | Fujinami | B60T 7/22 701/70 |
| 2006/0149429 | A1 * | 7/2006 | Aizawa | G01C 21/36 701/1 |
| 2008/0097671 | A1 * | 4/2008 | Kojo | B62D 5/0481 701/43 |
| 2009/0128318 | A1 * | 5/2009 | Nagata | B60T 7/22 340/467 |
| 2013/0325279 | A1 * | 12/2013 | Fujimoto | G06F 17/00 701/74 |

FOREIGN PATENT DOCUMENTS

| | | | | |
|---|---|---|---|---|
| JP | 2011-75427 | A | | 4/2011 |
| JP | 2013-249026 | A | | 12/2013 |
| JP | 2016-060313 | A | | 4/2016 |
| JP | 2016060313 | A | * | 4/2016 |

* cited by examiner

FIG. 4

| ACCELERATION | LED100a | LED100b | LED100c | LED100d | LED100e | LED100f |
|---|---|---|---|---|---|---|
| −6m/s^2 | 100% | 80% | 60% | 45% | 15% | 0% |
| −4m/s^2 | 85% | 70% | 60% | 45% | 25% | 15% |
| −2m/s^2 | 65% | 60% | 55% | 50% | 40% | 30% |
| 0m/s^2 | 50% | 50% | 50% | 50% | 50% | 50% |
| 2m/s^2 | 30% | 40% | 50% | 55% | 60% | 65% |
| 4m/s^2 | 15% | 25% | 45% | 60% | 70% | 85% |
| 6m/s^2 | 0% | 15% | 45% | 60% | 80% | 100% |

IN-VEHICLE PRODUCTION LIGHTING SYSTEM

CROSS REFERENCE TO RELATED APPLICATION

This application is based upon and claims the benefit of priority from the prior Japanese Patent Application No. 2016-201419, filed on Oct. 13, 2016, the entire contents of which are incorporated herein by reference.

BACKGROUND

1. Technical Field

The disclosure relates to an in-vehicle production lighting system.

2. Related Art

Various production lighting systems have been proposed that produce in-car environment, for example, by changing the color of interior lighting or by blinking depending on various vehicle conditions, such as start-up, running, shut-down, shift position, the degree of eco-driving, or engine speed, and thus increases the enjoyment of driving. Such a production lighting system is disclosed in JP 2016-60313 A.

SUMMARY

However, in the production lighting system described above, effects according to driver's and passenger's ride feel cannot be produced during running of a vehicle.

More particularly, a production lighting system has not yet been developed that produces visual effects corresponding to acceleration feel from vehicle launch up to a predetermined speed, deceleration feel when braking, feel when subjected to lateral G-forces in a turn, and the like.

The disclosure is directed to an in-vehicle production lighting system capable of increasing the enjoyment of driving by producing visual effects associated with the acceleration of a vehicle.

An in-vehicle production lighting system in accordance with some embodiments includes: an acceleration sensor configured to detect an acceleration of a vehicle; light emitters arranged at a prescribed position in a cabin of the vehicle and capable of changing light intensity and light color in a prescribed lighting pattern; and a controller configured to generate or select the prescribed lighting pattern depending on a detection result obtained by the acceleration sensor and control the light emitters.

The acceleration sensor may include: a longitudinal acceleration sensor configured to detect a longitudinal acceleration of the vehicle; and a lateral acceleration sensor configured to detect a lateral acceleration acting on the vehicle.

The light emitters may include LED light-emitting units.

The prescribed position in the cabin may be at least one of an inside of a door, a dashboard, a center console, or a vicinity of a shift knob of the vehicle.

The controller may be configured to illuminate the light emitters with a prescribed warning color upon the acceleration detected by the acceleration sensor exceeding a threshold.

The configuration described above produces visual effects associated with the acceleration of a vehicle, thereby increasing the enjoyment of driving.

BRIEF DESCRIPTION OF DRAWINGS

FIG. 4 is a table showing the relationship between the acceleration and the LED light intensity (i.e., a lighting pattern) employed in the in-vehicle production lighting system according to the first embodiment.

DETAILED DESCRIPTION

Figure 1:
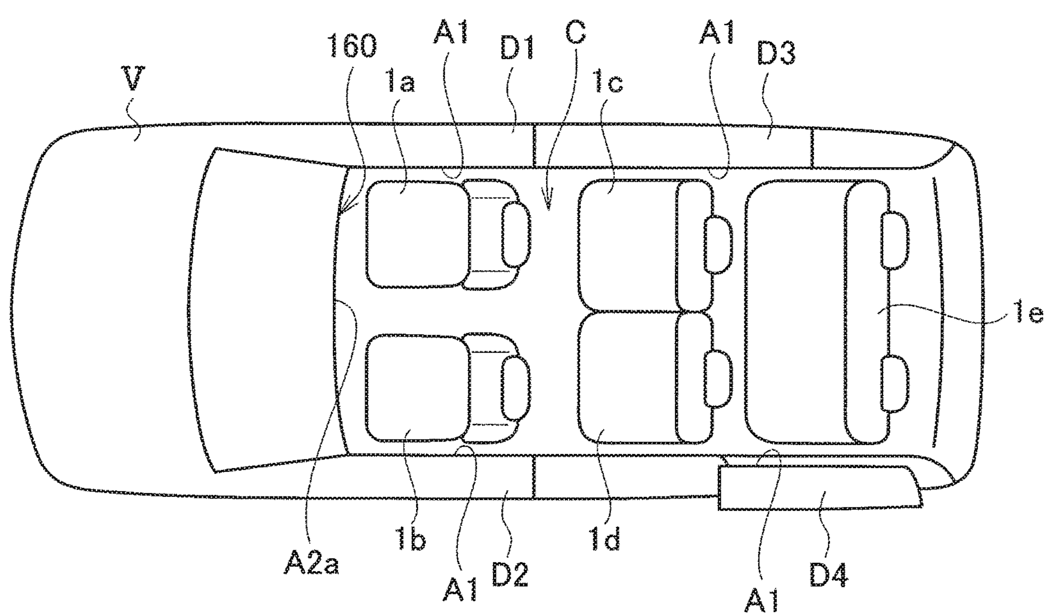
FIG. 1 illustrates an exemplary structure of a vehicle equipped with an in-vehicle production lighting system according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

An in-vehicle production lighting system A1 according to a first embodiment of the present invention is described with reference to FIGS. 1 to 6.

Overall Structure

FIG. 1 illustrates an exemplary structure of a vehicle V equipped with in-vehicle production lighting systems A1.

In an example illustrated in FIG. 1, a cabin C of the vehicle V is provided with seats such as the driver's seat 1*a*, the front passenger seat 1*b*, and rear seats 1*c* to 1*e*.

Doors D1 to D4 are provided on the left and right sides of the vehicle V. While the doors D1 to D3 are typical hinged doors in FIG. 1 and the door D4 is a sliding door, the doors D1 to D4 are not limited to these types of doors and, for example, the way of opening and closing the door is optional.

In-vehicle production lighting systems A1 described below are mounted inside the doors D1 to D4.

In the example illustrated in FIG. 1, an in-vehicle production lighting system A2 (corresponding to a second embodiment) is also mounted in a dashboard 160 in front of the driver's seat 1*a* and the front passenger seat 1*b*.

Positions in which the in-vehicle production lighting systems A1 etc. are mounted are not limited to the example of FIG. 1, and they can be mounted anywhere, in the cabin C, for easy viewing by the driver and passengers.

Figure 2:
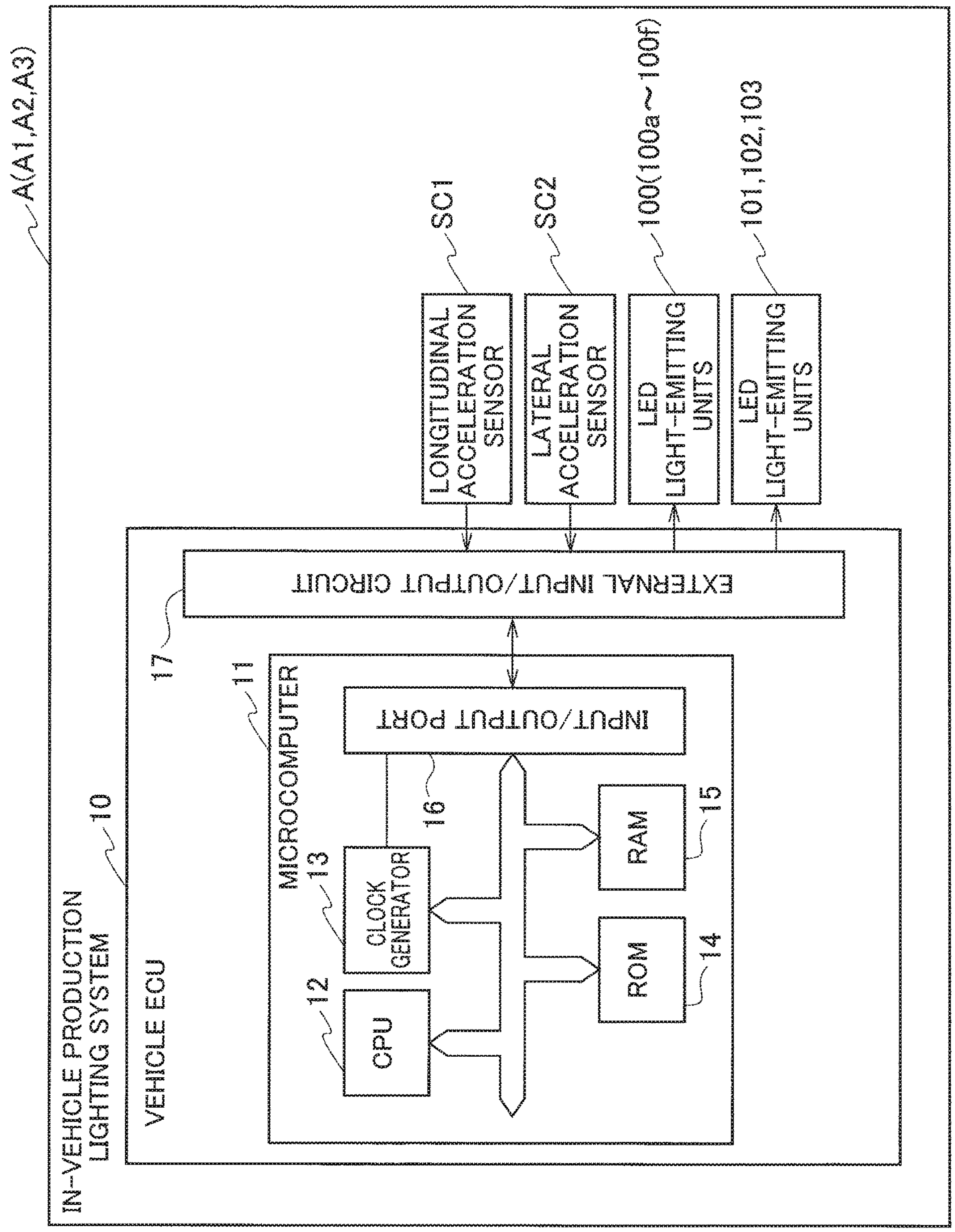
FIG. 2 is a block diagram illustrating an exemplary structure of the in-vehicle production lighting system according to the first embodiment.

Referring now to the block diagram of FIG. 2, an exemplary structure of the in-vehicle production lighting system A1 according to the present embodiment is described.

As illustrated in FIG. 2, the in-vehicle production lighting system A1 includes a vehicle electronic control unit (ECU) 10 as a controller, an acceleration sensor SC (SC1, SC2) configured to detect the acceleration of the vehicle, and LED light-emitting units 100 to 103 as a light emitter.

The vehicle ECU includes a microcomputer 11 and an external input/output circuit 17.

The microcomputer 11 includes a central processing unit (CPU) 12 for performing various operations, a clock generator 13 for generating a clock signal to synchronize devices, a read only memory (ROM) 14 for storing various control programs and data, a random access memory (RAM) 15 for providing, for example, a work area for various operations, an input/output port 16 for transmitting various programs and data to the external input/output circuit 17 and receiving them from the external input/output circuit 17, and the like.

In the present embodiment, the acceleration sensor SC includes a longitudinal acceleration sensor SC1 configured to detect the longitudinal acceleration of the vehicle V and a lateral acceleration sensor SC2 configured to detect the lateral acceleration acting on the vehicle V.

The acceleration sensor SC (SC1, SC2) may comprise, for example, a micro electro-mechanical systems (MEMS) device.

Only one of the longitudinal acceleration sensor SC1 and the lateral acceleration sensor SC2 may be provided.

The vehicle ECU 10 and the LED light-emitting units 100 to 103 can be connected through the in-vehicle LAN (e.g., controller area network (CAN), local interconnect network (LIN), or clock extension peripheral interface (CXPI)).

Structure of LED Light-Emitting Unit, Etc.

Exemplary structures of the in-vehicle production lighting system A1 and the LED light-emitting unit 100 are described with reference to FIGS. 3A and 3B.

Figure 3A:
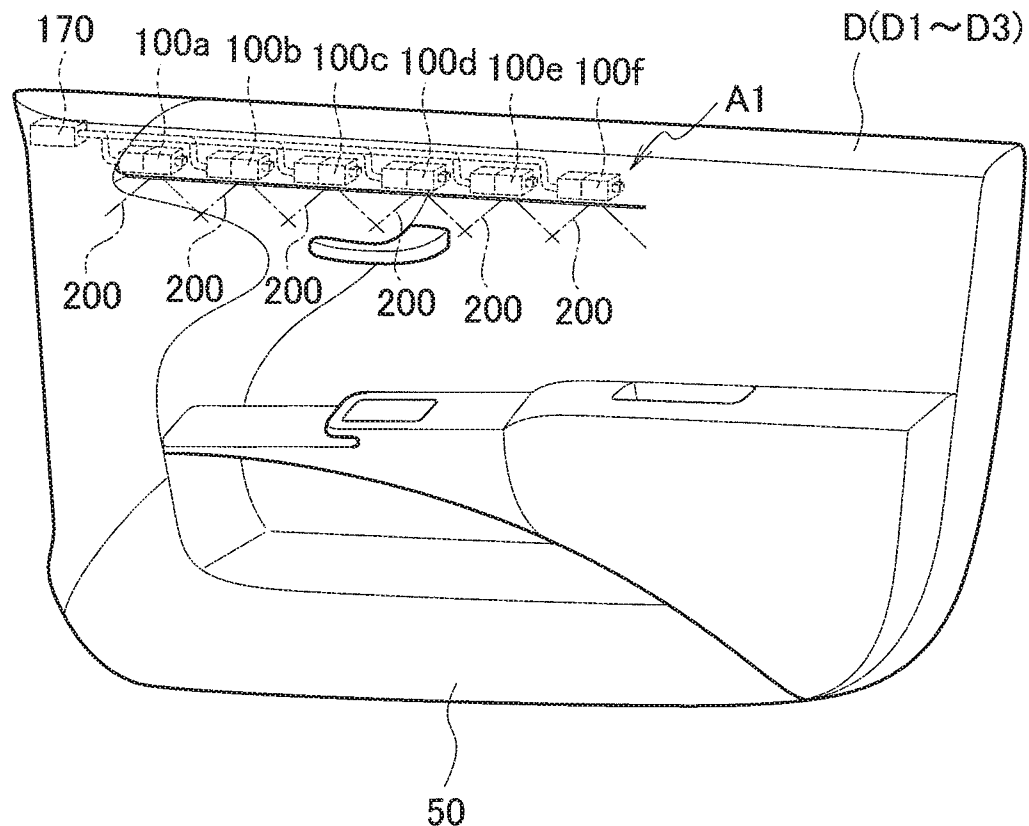
FIG. 3A is an overall view showing the exemplary structure of the in-vehicle production lighting system according to the first embodiment.

In an example illustrated in FIG. 3A, a total of six LED light-emitting units 100 (100*a* to 100*f*) are arranged inside the doors D (D1 to D4).

Each of the doors D has an inner cavity portion 55 formed in the upper part of an inner wall material 50 that is, for example, plastic-molded.

The inner cavity portion 55 receives a plurality (six in the present embodiment) of LED light-emitting units 100*a* to 100*f* arranged in the longitudinal direction of the vehicle.

The LED light-emitting units 100*a* to 100*f* are connected to the aforementioned vehicle ECU 10 through a connector 170.

Figure 3B:
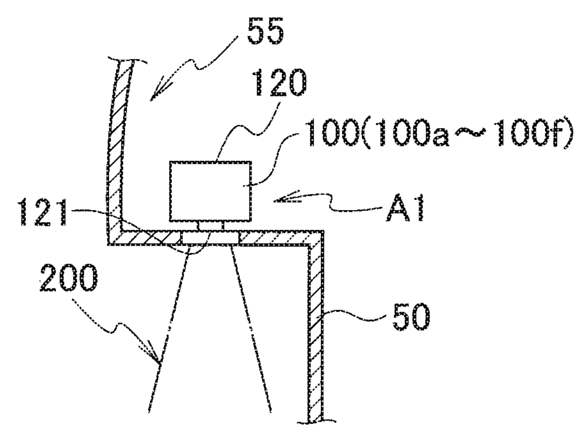
FIG. 3B is a partial cross-sectional view of the in-vehicle production lighting system shown in FIG. 3A.

Each of the LED light-emitting units 100*a* to 100*f*, which incorporates an LED device (not shown) in a housing 120, is configured to emit a light beam 200 from a light-emitting portion 121 positioned downward in FIG. 3B in a prescribed pattern by being controlled by the vehicle ECU 10, etc. As explained below, the vehicle ECU 10 generates or selects a prescribed lighting pattern depending on a detection result obtained by the acceleration sensor SC (SC1, SC2).

Lighting Pattern Example

While the relationship between the acceleration detected by the acceleration sensor SC (SC1, SC2) and the lighting pattern of the LED light-emitting units 100*a* to 100*f* is not particularly limited, dimming as shown in the table of FIG. 4 may be used for example.

That is, in the example shown in the table of FIG. 4, dimming is performed according to the acceleration detected by the longitudinal acceleration sensor SC1 configured to detect the longitudinal acceleration of the vehicle V: For example, the LED light-emitting unit 100*a* is dimmed using 100% light intensity (light amount) at −6 m/s2 during deceleration, 85% light intensity at −4 m/s2 and 65% light intensity at −2 m/s2; 50% light intensity at 0 m/s2 during stationary; and 30% light intensity at 2 m/s2 during acceleration, 15% light intensity at 4 m/s2 and 0% light intensity at 6 m/s2.

Also by dimming other LED light-emitting units 100*b* to 100*f* in the degree shown in the table of FIG. 4, the LED light-emitting units 100 (100*a* to 100*f*) as a whole allows for expression in which light flows longitudinally or expression such as gradation display, according to the acceleration.

This increases the visual enjoyment of the occupants depending on the sense of acceleration, thereby improving production effectiveness.

If the LED light-emitting units 100 (100*a* to 100*f*) can change the light color, the light color may be changed in a prescribed pattern according to the acceleration.

If the acceleration during deceleration or acceleration exceeds a prescribed threshold, the driver and passengers may be warned of sudden braking or rapid acceleration and prompted to pay attention, for example, by illuminating all of the LED light-emitting units 100*a* to 100*f* using 100% light intensity or by illuminating them with a prescribed warning color (e.g., red).

Exemplary Configuration of Electrical Connection

Figure 5:
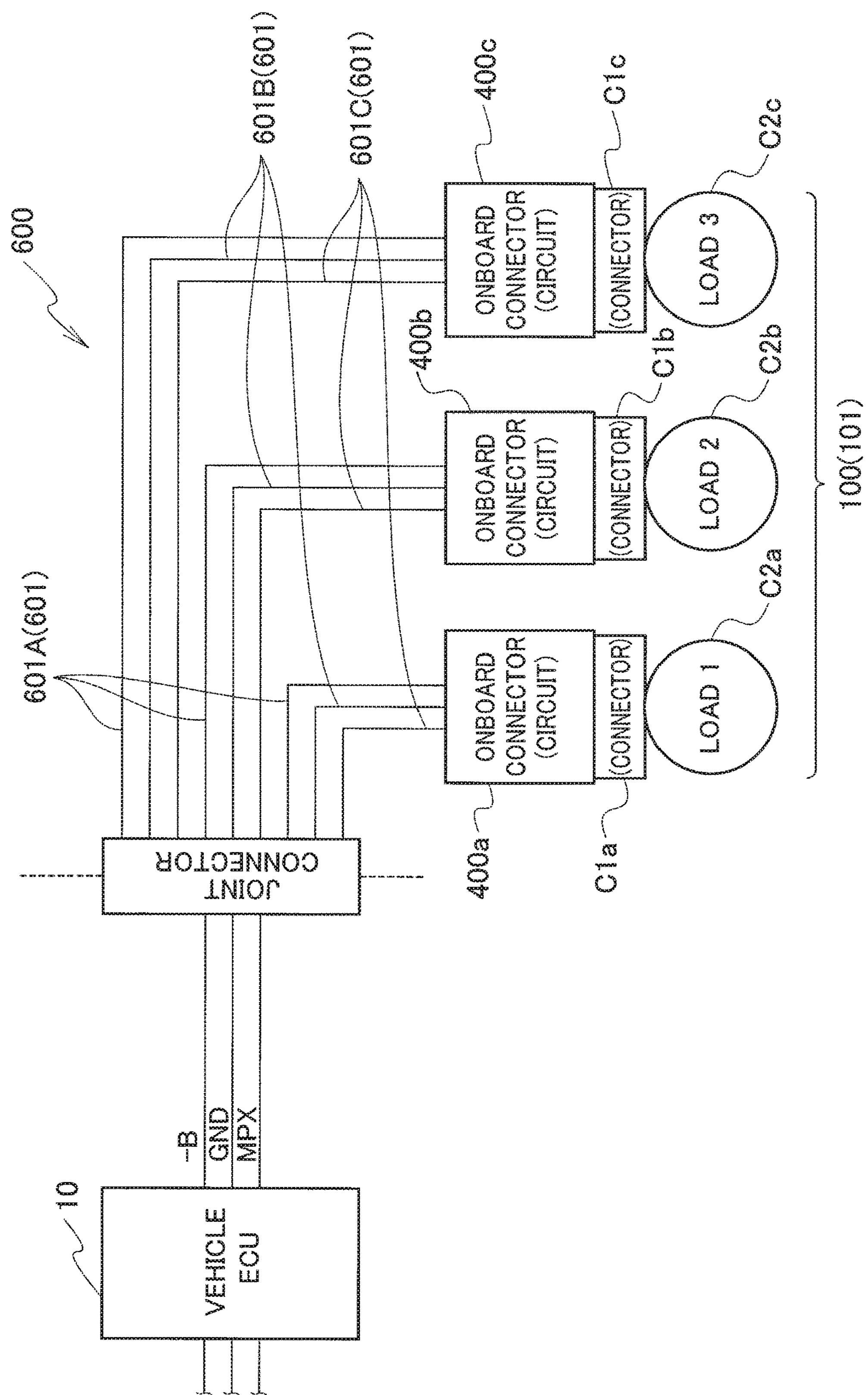
FIG. 5 illustrates an exemplary configuration of electrical connection applicable to the in-vehicle production lighting system according to the first embodiment.

An exemplary configuration of electrical connection applicable to the in-vehicle production lighting system A1 is briefly described with reference to FIG. 5.

When the vehicle ECU 10, such as shown in FIG. 2, controls the plurality of LED light-emitting units 100, load may be concentrated on the vehicle ECU 10. Accordingly, as illustrated in FIG. 5, a configuration may be adopted in which a wire side connector C1 (C1*a* to C1*c*), which mates with a load side connector C2 (C2*a* to C2*c*) connected to the LED light-emitting unit 100 (100*a* to 100*f*) etc., is provided with a circuit body connected thereto and control is distributed by the vehicle ECU 10 and the circuit body.

Connectors 400 (400*a* to 400*c*), each having such a circuit body, are referred to as an "onboard connector".

Each of the onboard connectors 400 includes a circuit body and a housing for receiving the circuit body. An end of an electrical wire 601 of a wire harness 600 is connected to a first terminal of the circuit body. An ECU side connector C1 (C1*a* to C1*c*) is formed in the housing, the ECU side connector C1 (C1*a* to C1*c*) being matable with the load side connector C2 (C2_a_ to C2_c_) formed in the LED light-emitting unit 100 (100_a_ to 100_f_) etc. to be controlled.

The vehicle ECU 10 and the onboard connectors 400 can be connected through the in-vehicle LAN (e.g., controller area network (CAN), local interconnect network (LIN), or clock extension peripheral interface (CXPI)) instead of through the wire harness 600.

When the onboard connectors 400 (400_a_ to 400_c_) configured as above are used, the vehicle ECU 10 transmits information about the acceleration detected by the acceleration sensor SC (SC1, SC2) to the onboard connectors 400 through the wire harness 600 or the in-vehicle LAN, while control of the illumination of the LED light-emitting units 100 (100_a_ to 100_f_), 101 to 103 (second and third embodiments) can be performed by circuits of the onboard connectors 400.

Second Embodiment

Figure 6:
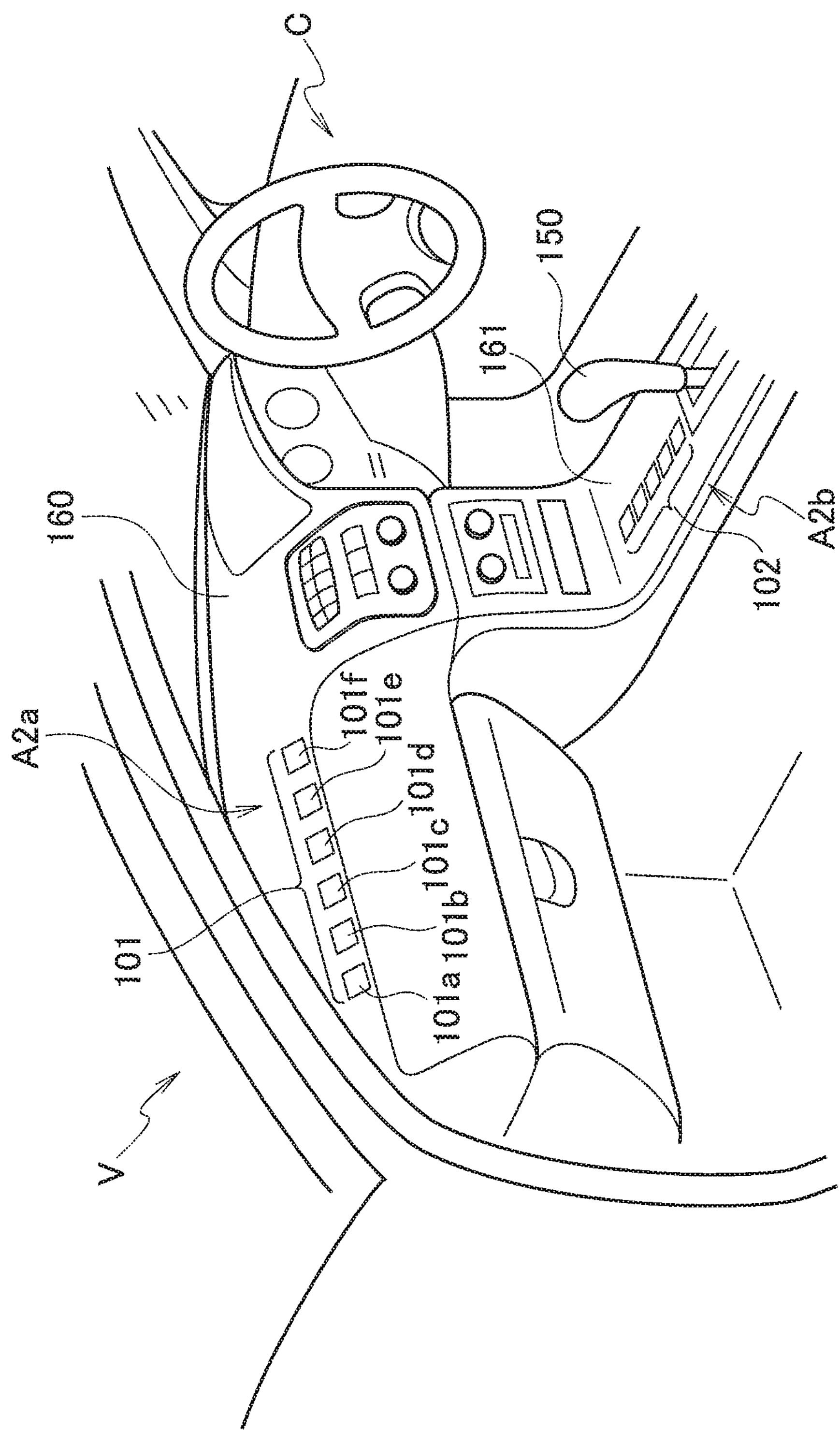
FIG. 6 is a schematic perspective view showing an exemplary structure of an in-vehicle production lighting system according to a second embodiment.

An in-vehicle production lighting system A2 (A2_a_, A2_b_) according to a second embodiment of the present invention is described with reference to FIG. 6.

Since the internal structure etc. of an in-vehicle production lighting system A2 are similar to those of the in-vehicle production lighting system A1 according to the first embodiment, the description thereof is omitted.

An in-vehicle production lighting system A2_a_ according to the second embodiment includes a plurality (six in the example of FIG. 6) of LED light-emitting units 101 (101_a_ to 101_f_) mounted on the front side (i.e., the side facing the driver or the front passenger) of the dashboard 160 located in the cabin C of the vehicle V.

The LED light-emitting units 101 of the in-vehicle production lighting system A2_a_ allow for expression in which light flows in the transverse direction of the vehicle V or expression such as gradation display, according to the acceleration detected by the lateral acceleration sensor SC2 (see FIG. 2) configured to detect the lateral acceleration acting on the vehicle V.

An in-vehicle production lighting system A2_b_ includes an LED light-emitting unit 102 mounted in a center console 161 located in the cabin C of the vehicle V.

The LED light-emitting unit 102 of the in-vehicle production lighting system A2_b_ allows for expression in which light flows in the longitudinal direction of the vehicle V or expression such as gradation display, according to the acceleration detected by the longitudinal acceleration sensor SC1 (see FIG. 2) configured to detect the longitudinal acceleration of the vehicle V.

Third Embodiment

Figure 7:
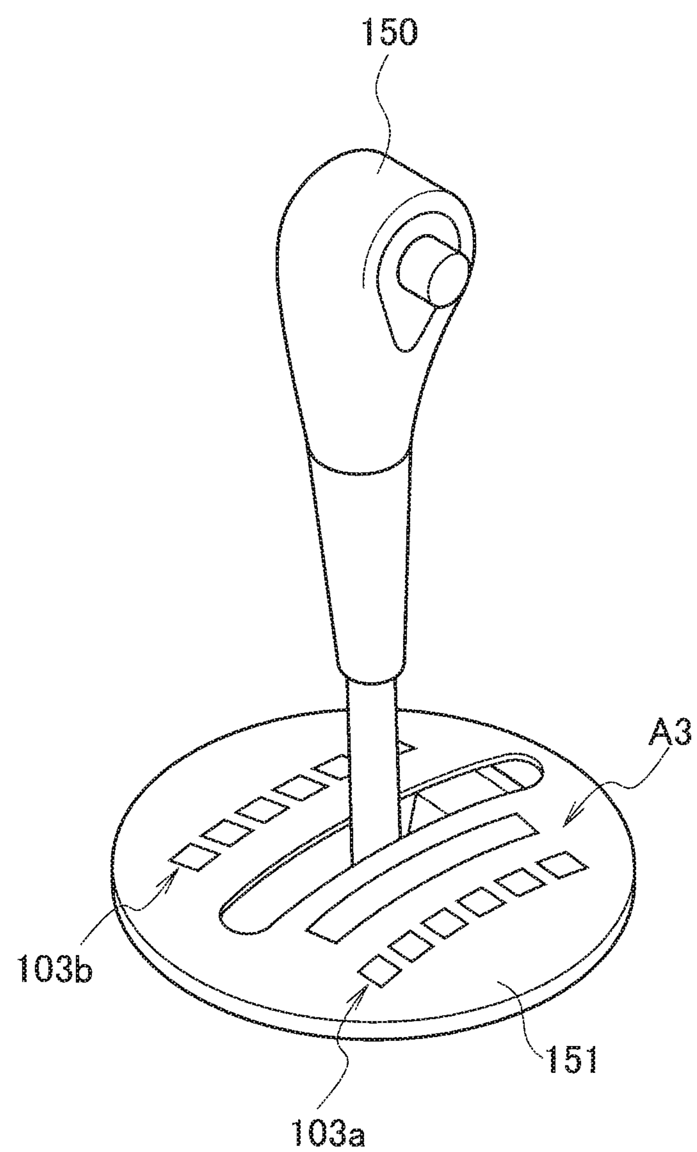
FIG. 7 is a schematic perspective view showing an exemplary structure of an in-vehicle production lighting system according to a third embodiment.

An in-vehicle production lighting system A3 according to a third embodiment of the present invention is described with reference to FIG. 7.

Since the internal structure etc. of an in-vehicle production lighting system A3 are similar to those of the in-vehicle production lighting system A1 according to the first embodiment, the description thereof is omitted.

An in-vehicle production lighting system A3 includes LED light-emitting units 103 (103_a_, 103_b_) mounted on both sides of abase 151 of a shift knob 150 located in the cabin of the vehicle V.

The LED light-emitting units 103_a_, 103_b_ of the in-vehicle production lighting system A3 allow for expression in which light flows in the longitudinal direction of the vehicle V or expression such as gradation display, according to the acceleration detected by the longitudinal acceleration sensor SC1 (see FIG. 2) configured to detect the longitudinal acceleration of the vehicle V.

Procedures for LED Control Process

Figure 8:
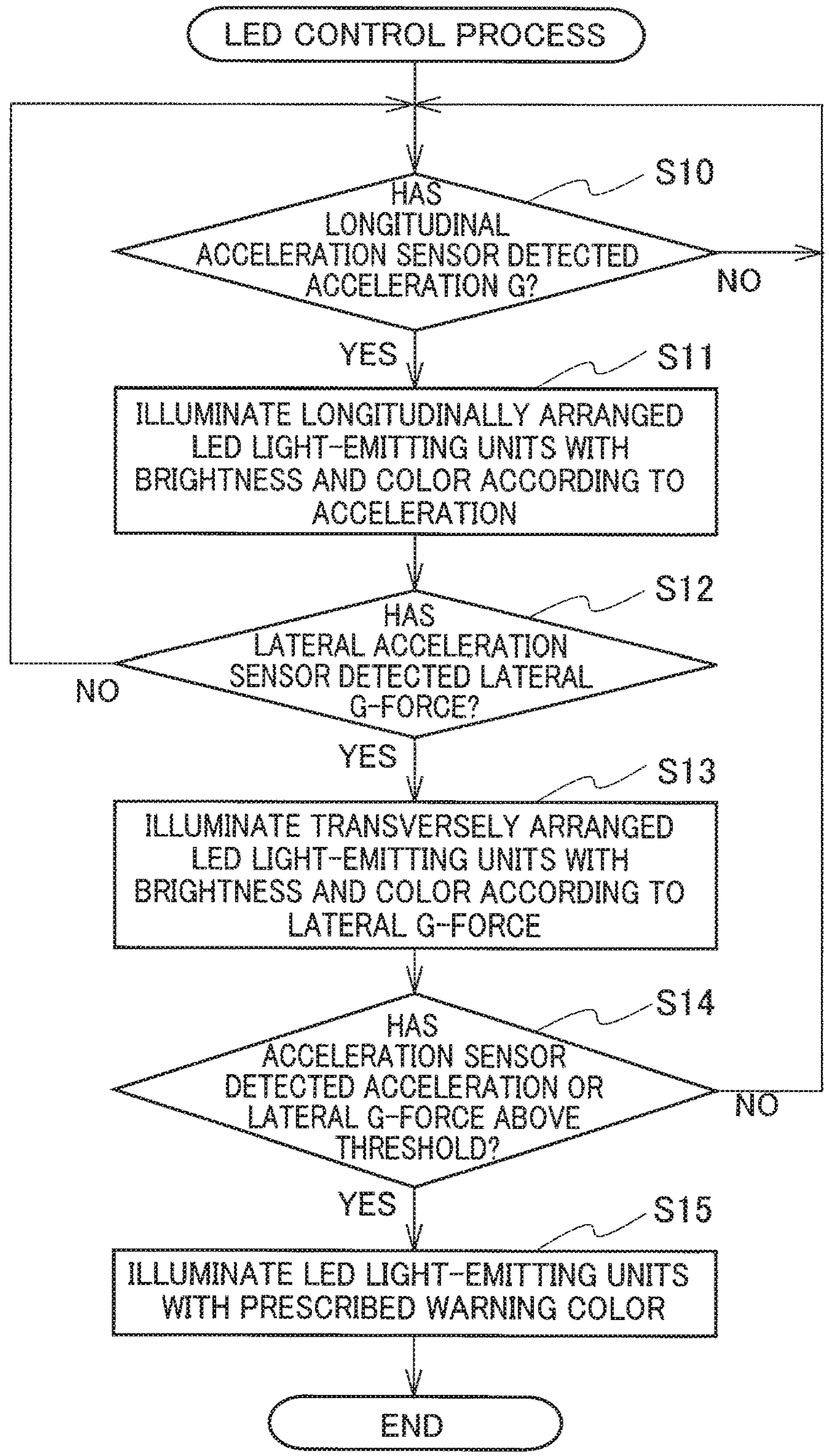
FIG. 8 is a flow chart illustrating exemplary procedures for LED control process in the in-vehicle production lighting systems according to the embodiments.

Procedures for LED control process, which are performed by the aforementioned vehicle ECU 10 or onboard connectors 400, in the in-vehicle production lighting system A1 (A2, A3) are described with reference to the flow chart in FIG. 8.

When LED control process is started, it is first determined whether the longitudinal acceleration sensor SC1 has detected an acceleration G in step S10.

Then, if the determination is "No", step S10 is repeatedly performed; if the determination is "Yes", the process proceeds to step S11.

In step S11, longitudinally arranged LED light-emitting units (e.g., the LED light-emitting units 100 of the in-vehicle production lighting system A1, the LED light-emitting unit 102 of the in-vehicle production lighting system A2_b_, the LED light-emitting units 103_a_, 103_b_ of the in-vehicle production lighting system A3, etc.) are illuminated with brightness and color according to the acceleration, and then the process proceeds to step S12.

In step S12, it is determined whether the lateral acceleration sensor SC2 has detected an acceleration G (i.e., lateral G-force).

Then, the process returns to step S10 if the determination is "No", and the process proceeds to step S13 if the determination is "Yes".

In step S13, transversely (i.e., vehicle V widthwise) arranged LED light-emitting units (e.g., the LED light-emitting units 101 of the in-vehicle production lighting system A2_a_) are illuminated with brightness and color according to the acceleration, and then the process proceeds to step S14.

In step S14, it is determined whether the acceleration sensor (the longitudinal acceleration sensor SC1 or the lateral acceleration sensor SC2) has detected the acceleration or lateral G-force above the threshold.

Then, the process returns to step S10 if the determination is "No", and the process proceeds to step S15 if the determination is "Yes".

In step S15, for example, the LED light-emitting units 100 of the in-vehicle production lighting system A1, etc. are illuminated with a prescribed warning color (e.g., red), and then the process is ended.

Such an LED control process produces visual effects associated with the acceleration of the vehicle V, thereby increasing the enjoyment of driving.

If the acceleration during deceleration or acceleration exceeds a prescribed threshold, the LED light-emitting units 100 etc. are illuminated with a warning color so that the driver and passengers can be warned of sudden braking or rapid acceleration and prompted to pay attention, thereby improving safety.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An in-vehicle production lighting system comprising:

an acceleration sensor configured to detect a longitudinal acceleration of a vehicle;

light emitters arranged in a longitudinal direction of the vehicle at a prescribed position in a cabin of the vehicle and capable of changing light intensity and light color in a prescribed lighting pattern; and a controller configured to generate or select the prescribed lighting pattern depending on a detection result obtained by the acceleration sensor and control the light emitters to provide a gradation display in the longitudinal direction of the vehicle.

2. The in-vehicle production lighting system according to claim 1, wherein the acceleration sensor comprises:

a longitudinal acceleration sensor configured to detect the longitudinal acceleration of the vehicle; and a lateral acceleration sensor configured to detect a lateral acceleration acting on the vehicle.

3. The in-vehicle production lighting system according to claim 1, wherein the light emitters comprise LED light-emitting units.

4. The in-vehicle production lighting system according to claim 1, wherein the prescribed position in the cabin is at least one of an inside of a door, a dashboard, a center console, or a vicinity of a shift knob of the vehicle.

5. An in-vehicle production lighting system comprising:

an acceleration sensor configured to detect a lateral acceleration of a vehicle;

light emitters arranged in a lateral direction of the vehicle at a prescribed position in a cabin of the vehicle and capable of changing light intensity and light color in a prescribed lighting pattern; and a controller configured to generate or select the prescribed lighting pattern depending on a detection result obtained by the acceleration sensor and control the light emitters to provide a gradation display in the lateral direction of the vehicle.

6. An in-vehicle production lighting system comprising:

an acceleration sensor configured to detect an acceleration of a vehicle;

light emitters arranged at a prescribed position in a cabin of the vehicle and capable of changing light intensity and light color in a prescribed lighting pattern; and a controller configured to generate or select the prescribed lighting pattern depending on a detection result obtained by the acceleration sensor and control the light emitters, wherein the controller is configured to illuminate the light emitters with a prescribed warning color upon the acceleration detected by the acceleration sensor exceeding a threshold to provide a warning to an occupant of the vehicle of a sudden acceleration.

7. The in-vehicle production lighting system according to claim 1, wherein the controller is further configured to:

control the light emitters to emit light at a first set of light intensities based on a first acceleration value, wherein each light emitter includes a different light intensity; and control the light emitters to emit light at a second set of light intensities based on a second acceleration value, wherein each light emitter includes a different light intensity and wherein the second set of light intensities is different than the first set of light intensities.

* * * * *